(12) United States Patent
Rukman et al.

(10) Patent No.: US 8,942,358 B2
(45) Date of Patent: *Jan. 27, 2015

(54) UNIFIED AND BEST MESSAGING SYSTEMS FOR COMMUNICATION DEVICES

(71) Applicant: Lenovo Group Limited, Quarry Bay (HK)

(72) Inventors: Jason Rukman, Woodinville, WA (US); Joseph Edward Heitzeberg, Seattle, WA (US); Thomas Jay Hoover, Seattle, WA (US); Ethan Lowry, Seattle, WA (US); Patrick Greer Franklin, Covington, WA (US)

(73) Assignee: Lenovo Group Limited, Quarry Bay (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,778

(22) Filed: Dec. 23, 2013

(65) Prior Publication Data

US 2014/0120963 A1    May 1, 2014

Related U.S. Application Data

(63) Continuation of application No. 13/765,570, filed on Feb. 12, 2013, now Pat. No. 8,644,462, which is a continuation of application No. 12/722,343, filed on Mar. 11, 2010, now Pat. No. 8,391,450, which is a (Continued)

(51) Int. Cl.
| | |
|---|---|
| *H04M 11/00* | (2006.01) |
| *H04W 4/00* | (2009.01) |
| *H04M 1/725* | (2006.01) |

(Continued)

(52) U.S. Cl.
CPC ............... *H04W 4/14* (2013.01); *H04L 12/589* (2013.01); *H04L 51/36* (2013.01); *H04W 4/12* (2013.01)
USPC .................. 379/88.13; 379/88.16; 379/88.18; 455/466; 455/412.1

(58) Field of Classification Search
USPC ............... 379/67.1, 88.13–88.18, 355, 88.11; 704/270; 455/466
See application file for complete search history.

(56) References Cited

U.S. PATENT DOCUMENTS

| | | | | |
|---|---|---|---|---|
| 5,946,377 | A | * | 8/1999 | Wolf ........................... 379/88.22 |
| 6,269,336 | B1 | * | 7/2001 | Ladd et al. .................... 704/270 |

(Continued)

OTHER PUBLICATIONS

Jonathan B. Postel, "Simple Mail Transfer Protocol," Information Sciences Institute, University of Southern California, Aug. 1982, pp. 1-68.

(Continued)

*Primary Examiner* — Mohammad Islam
(74) *Attorney, Agent, or Firm* — Sheppard, Mullin, Richter & Hampton LLP

(57) ABSTRACT

A unified messaging system which can provide messaging services for a plurality of different "message types" is disclosed. The unified messaging system can serve as a single interface to a number of messaging services provided by various messaging components which use different message types (e.g., mail server). A unified message type is implemented and presented to a user as an abstract message. In addition, the unified messaging system can automatically determine, based on a first selected feature, if one or more message types should be used. A particular message type can also be automatically selected as a "best message type" based on one or more selected options.

21 Claims, 6 Drawing Sheets

Related U.S. Application Data continuation of application No. 10/981,970, filed on Nov. 4, 2004, now Pat. No. 7,756,256.

(60) Provisional application No. 60/525,564, filed on Nov. 26, 2003.

(51) Int. Cl.
*H04L 12/58* (2006.01)
*H04W 4/14* (2009.01)
*H04W 4/12* (2009.01)

(56) References Cited

U.S. PATENT DOCUMENTS

| | | | | |
|---|---|---|---|---|
| 6,868,143 | B1* | 3/2005 | Menon et al. | 379/88.13 |
| 7,212,808 | B2* | 5/2007 | Engstrom et al. | 455/412.1 |
| 7,702,315 | B2* | 4/2010 | Engstrom et al. | 455/412.1 |
| 7,904,099 | B2* | 3/2011 | Liang | 455/466 |
| 8,028,073 | B2* | 9/2011 | Maes et al. | 709/227 |
| 8,068,588 | B2* | 11/2011 | Ramanathan et al. | 379/88.13 |
| 2002/0049817 | A1* | 4/2002 | Drory et al. | 709/206 |
| 2003/0065724 | A1* | 4/2003 | Clark | 709/206 |

OTHER PUBLICATIONS

"Short Message Service," Wikipedia, the free encyclopedia, Jan. 19, 2006, http://en.wikipedia.org/wiki/Short_Message_Service, pp. 1-8.

P. Resnick, Editor, "Internet Message Format," Qualcomm Incorporated, Apr. 2001, pp. 1-48.

Myers et al., "RFC 1939-Post Office Protocol-Version 3," Dover Beach Consulting Inc., May 1996, http://www.faqs.org/rfcs/rfc1939.html, pp. 1-19.

* cited by examiner

UNIFIED AND BEST MESSAGING SYSTEMS FOR COMMUNICATION DEVICES

CROSS-REFERENCE TO RELATED APPLICATIONS

This application is a continuation of U.S. patent application Ser. No. 13/765,570, filed Feb. 12, 2013, entitled "Unified and Best Messaging Systems for Communication Devices," which is a continuation of U.S. patent application Ser. No. 12/722,343, filed Mar. 11, 2010, entitled "Unified and Best Messaging Systems for Communication Devices," now U.S. Pat. No. 8,391,450, which is a continuation of U.S. patent application Ser. No. 10/981,970, filed Nov. 4, 2004, entitled "Unified and Best Messaging Systems for Communication Devices," now U.S. Pat. No. 7,756,256, which claims the benefit of Provisional U.S. Patent Application No. 60/525,564, filed Nov. 26, 2003, entitled "Best Messaging," each of which is incorporated herein by reference in its entirety.

BACKGROUND OF THE INVENTION

The present invention relates to communication systems, and more particularly, to a messaging system used for exchanging information between various communication environments.

Modern communication systems facilitate communication of information in many forms and between various communication devices (e.g., computers, wireless terminals or devices, cellular telephones, pagers, personal digital assistants, etc.). Given the popularity of modem communication systems, extensive efforts have been made by a number of entities to provide users with increasingly better communication devices. These devices, among other things, provide a messaging system that allows users to exchange information. The messaging system can serve as an interface to a messaging services provided by a particular messaging provider or messaging server.

Typically, handheld communication devices have a relatively small amount of display space available in comparison to desktop devices (e.g., a personal desktop computer). Hence, the same solutions used to solve problems encountered in the desktop environment, may not be as effective for the handheld communication devices.

Moreover, the large number of different "message types" used today has introduced new challenges. A "message type" may, for example, pertain to a particular messaging protocol (e.g., SMS/EMS, WAP 275/276, imode mail, SMTP, POPS) and/or message formats (e.g., text, slideshow). This means that many message types can be formed, for example, when a particular message format is used with a particular messaging protocol. By way of example, considering only two message protocols SMS and MMS, many message types can be appropriately used (e.g., SMS-Text, SMS-Rich (EMS), MMS-slideshow (SMIL), MMS-multipart (inline)). Each message type has its own technical capabilities, limitations, and other particular attributes (e.g., message size limit, cost). Moreover, some message protocols may not support a particular format. These complexities have negatively affected the experience of the users of modern messaging systems. Typically, these users have to learn about various messaging interfaces (e.g., SMSC, MMSC, I-mode server, SMTP server, POP server). As a result, some users of messaging systems had to learn the technical capabilities and limitations of various message protocols, formats, and other technical details in order to exchange messages. Other users have often been frustrated and/or confused when a feature (or option) that is inappropriate and/or not desired has been selected.

Accordingly, there is a need for alternative messaging system.

SUMMARY OF THE INVENTION

Broadly speaking, the invention relates to a messaging system in a computing environment that may include a plurality of different "message types". A "message type" may, for example, pertain to a particular messaging protocol and/or message format. In general, a message type has one or more distinguishable characteristics which may be entirely based on form or conventions used to process the message.

In accordance with one aspect of the invention, a unified messaging system can provide messaging services in a computing environment that may include a plurality of different "message types". As will be appreciated, the unified messaging system can serve as a single interface to a number of messaging services provided by various messaging components which use different message types (e.g., mail server).

In one embodiment, the unified message system generates a unified message type which can be implemented and presented to a user as an abstract message that does not pertain to a particular message type. In addition, the unified messaging system can provide the user with a set of abstract features (or options) that the user can select without having to know or identify a particular message type. The abstract features can, for example, include a set of abstract operations that can be performed on a abstract message (e.g., send, receive, attach, slideshow, acknowledge receipt, phone), as well as other components which may be useful in a messaging environment, and possibly combined with one or more abstract operations (e.g., "send bob, "send bob acknowledgment receipt," send bob slideshow"). Moreover, the unified messaging system can automatically determine, based on a first selected feature, if one or more message types should be used. Message types that should not be used are automatically eliminated and the user can be presented only with a set of options that are still viable based on what has already been selected. In addition, a particular message type is automatically selected as a "best message type" based on one or more abstract selected options. The unified message can then be transformed to a particular message type (i.e., best message type) and transmitted. It should be noted that a particular message type may also be transformed to an abstract message which is presented to the user. In any case, a user can use a single messaging interface to services provided by various messaging servers. In addition, the user may use the services without having to know or select a particular message type as an appropriate message type can be automatically selected for the user. It should also be noted that only viable features (or options) can be displayed for the user in accordance with one embodiment of the invention. As a result, the user of the messaging system is not confronted with many potentially inappropriate features (or options). Hence, the user's experience is significantly improved and user will be free form learning the technical limitations and capabilities associated with various message types.

The invention can be implemented in numerous ways, including as a method, an apparatus, and computer readable media. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
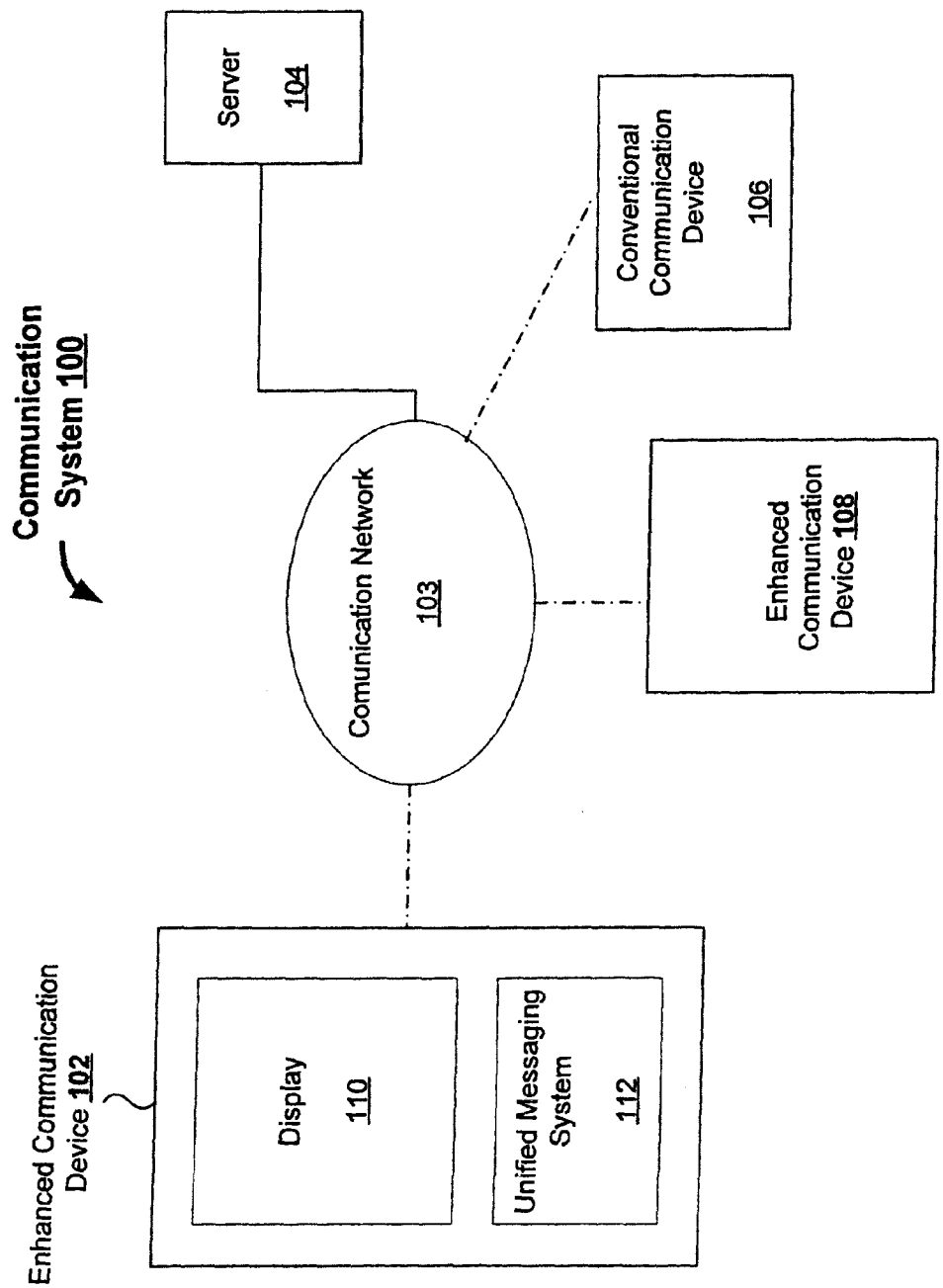
FIG. 1 illustrates a communication system including an enhanced communication device in accordance with one embodiment of the invention.

The invention pertains to a messaging system in a computing environment that may include a plurality of different "message types". A "message type" may, for example, pertain to a particular messaging protocol and/or message format. In general, a message type has one or more distinguishable characteristics which may be entirely based on form or conventions used to process the message.

In accordance with one aspect of the invention, a unified messaging system can provide messaging services in a computing environment that may include a plurality of different "message types". As will be appreciated, the unified messaging system can serve as a single interface to a number of messaging services provided by various messaging components which use different message types (e.g., mail server).

In one embodiment, the unified message system generates a unified message type which can be implemented and presented to a user as an abstract message that does not pertain to a particular message type. In addition, the unified messaging system can provide the user with a set of abstract features (or options) that the user can select without having to know or identify a particular message type. The abstract features can, for example, include a set of abstract operations that can be performed on a abstract message (e.g., send, receive, attach, slideshow, acknowledge receipt, phone), as well as other components which may be useful in a messaging environment and possibly combined with one or more abstract operations (e.g., "send bob," "send bob acknowledge receipt," "send bob slideshow"). Moreover, the unified messaging system can automatically determine, based on a first selected feature, if one or more message types should be used. Message types that should not be used are automatically eliminated and the user can be presented only with a set of options that are still viable based on what has already been selected. In addition, a particular message type is automatically selected as a "best message type" based on one or more abstract selected options. The unified message can then be transformed to a particular message type (i.e., best message type) and transmitted. It should be noted that a particular message type may also be transformed to an abstract message which is presented to the user. In any case, a user can use a single messaging interface to services provided by various messaging servers. In addition, the user may use the services without having to know or select a particular message type as an appropriate message type can be automatically selected for the user. It should also be noted that only viable features (or options) can be displayed for the user in accordance with one embodiment of the invention. As a result, the user of the messaging system is not confronted with many potentially inappropriate features (or options). Hence, the user's experience is significantly improved and user will be free form learning the technical limitations and capabilities associated with various message types.

Embodiments of the invention are discussed below with reference to FIGS. 1A-4. However, those skilled in the art will readily appreciate that the detailed description given herein with respect to these figures is for explanatory purposes as the invention extends beyond these limited embodiments.

FIG. 1 illustrates a communication system 100 including an enhanced communication device 102 in accordance with one embodiment of the invention. The enhanced communication device 102 can, for example, be implemented as a computer, a remote wireless device, a cell phone, a personal digital assistant, etc. The enhanced communication device 102 can communicate with a communication network 103. The communication network 103 may be or include, for example, the Internet, one or more campus intranets, local area networks (LANs), wide area networks (WANs), or wireless telecommunication networks, e.g., a cellular digital packet data (CDPD) network, a global system for mobile (GSM) communications network, a time division multiple access (TDMA) network, a personal digital cellular (PDC) network, or a personal handy-phone system (PHS) network. In any case, the communication network 103 facilitates communication between the enhanced communication device 102 and various other components of the communication system 100. These components can, for example, include a server 104, a conventional communication device 106 or another enhanced communication device 108.

For ease of illustration, the enhanced communication device 102 is depicted in FIG. 1 as providing a unified messaging system 112. However, as will be appreciated by those skilled in the art, the operations related to unified messaging system 112 can entirely or partially be performed at the server 104. Alternatively, the unified messaging system 112 can be implemented as a part of the hardware and/or software in the enhanced communication device 102. In any case, the unified messaging system 112 provides a unified messaging environment where various protocols and message types may be integrated. Moreover, in the integrated environment provided by the unified messaging system 112, the user does not have to learn about the capabilities and limitations of various protocols and/or message types that can be used to exchange messages partly because a unified messaging system is provided. In addition, the unified messaging system 112 provides many other features which further enhance the user's experience. These features include a unified inbox for storing various types of messages, and a "best messaging" feature that, among other things, displays a selected set of viable options for the user based on the options that the user has already selected. Furthermore, the "best messaging" feature can automatically select the appropriate mechanism (e.g., protocol, message type) to perform a desired option (delivering a message, viewing a message, etc.). "Best messaging" is further described below.

Figure 2A:
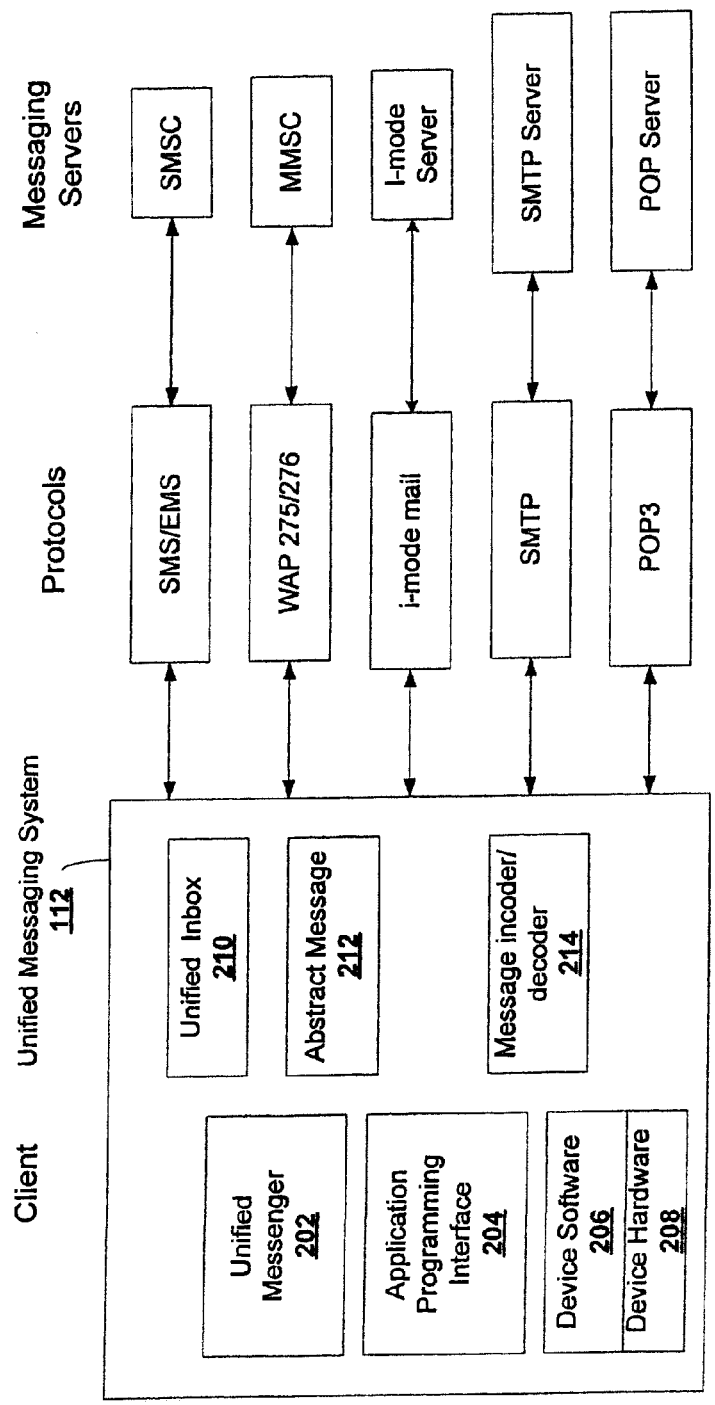
FIG. 2A depicts a unified messaging system in a computing environment in accordance with one embodiment of the invention.

To further illustrate, FIG. 2A depicts a unified messaging system 112 in accordance with one embodiment of the invention. As shown in FIG. 2A, several architectural levels that may be used to implement the unified messaging system 112. These architectural levels include: unified messenger 202, application programming interface (API) 204, device software 206 and device hardware 208. The unified messenger 202 uses the API 204 as an interface to device software 206 which in turn interacts with a device hardware 208. Thus, the unified messenger 202 can perform various messaging tasks (e.g., send, receive messages) via the device hardware 208. Moreover, the unified messenger 202 can perform messaging tasks using a variety of protocols (e.g., SMS/EMS, WAP275/ 276, imode mail, SMTP, POP). In other words, a single messaging application, namely, the unified messenger 202 may be used to interact with various protocols and message types. Hence, a user may be presented with a single unified messenger 202 to perform various messaging tasks using different messaging protocols and/or messaging types. In addition, a unified inbox 210 can be provided for the user. The unified inbox 210 can be used to store various message types despite the protocols used to transmit them. It should be noted that the unified messaging system 112 can behave as a client and use various protocols to interact with various messaging servers.

As shown in FIG. 2A, the messaging system 112 also provides an abstract message 212 and a message encoder/decoder 214. The abstract message 212 can be a conceptual representation of a generic message that may ultimately be mapped to a particular protocol and/or message form ("a message type"). The message encoder/decoder 214 can facilitate the mapping of the abstract message to a particular message type, and vice versa.

Figure 2B:
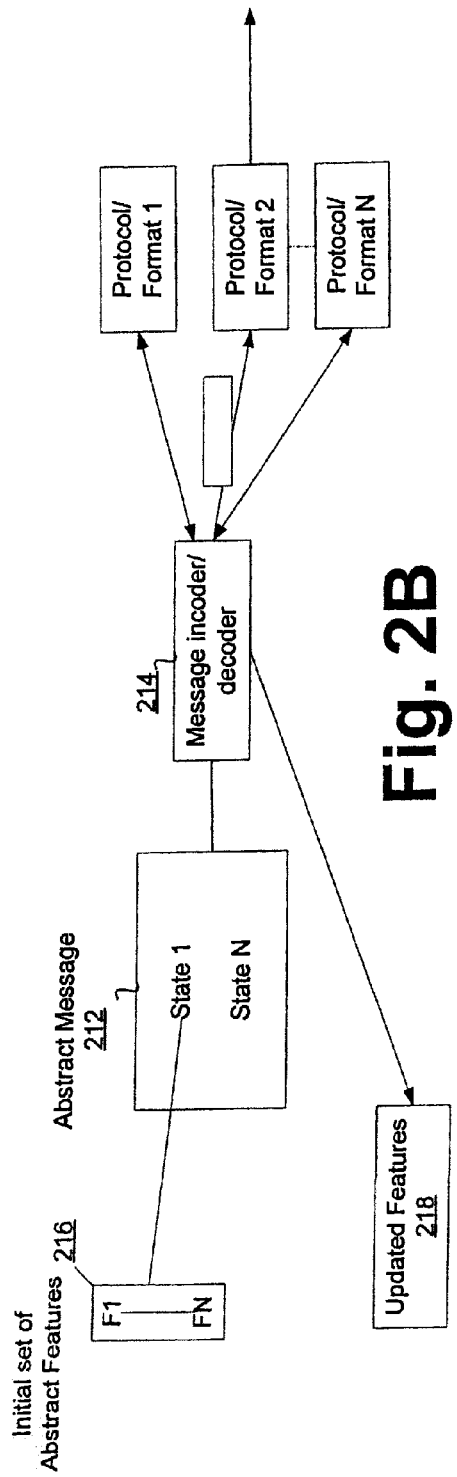
FIGS. 2B-2D depict an abstract message in connection with a message encoder/decoder.

Referring now to FIG. 2B, the abstract message 212 is depicted in connection with the message encoder/decoder 214. In addition, a set of features 216 are depicted. The set of features 216 represents a set of options that may be initially displayed for a user (e.g., send, compose, read, etc.). It should be noted that these set of features 216 can represent a set of abstract options that are available. In other words, the set of features 216 do not necessarily pertain to a particular message type. Also, selection of an initial particular feature (e.g. F1) results in storing one or more states (e.g., state 1) in the abstract message 212. When a state is added to the abstract message 212, the message encoder/decoder 214 determines based on the states currently in the abstract message whether a particular message type can be used. In addition, an updated feature set 218 may be presented based on this determination. In other words, one or more options may be eliminated based on the states stored in the abstract message 212. As a result, the user can be provided only with a set of viable options. Moreover, the user does not need to select a particular message type. An appropriate message type can be selected and automatically generated by the message encoder/decoder 214. Hence, the user can interact with a set of abstract features without knowing about the specific message types. Options that may not be viable or preferred after a selection of another option can be automatically eliminated and a message type (message protocol and/or format) can automatically be selected for the user.

It should be noted that the states I-N may be organized, for example, in various categories: composition layout (e.g., attachment, image inlining, slides), formatting (e.g., text, character set), preferences (e.g., priority, recipient acknowledgment), rules (e.g., use MMS if more than two (2) SMS messages have been sent), addressing message (e.g., to alias "Bob"): In general, any messaging attribute may be presented with one or more states which may be used to provide the user with a set of viable options. In addition, one or more states of the abstract message can be used to select a particular message type that is ultimately generated for the user.

Figure 2C:
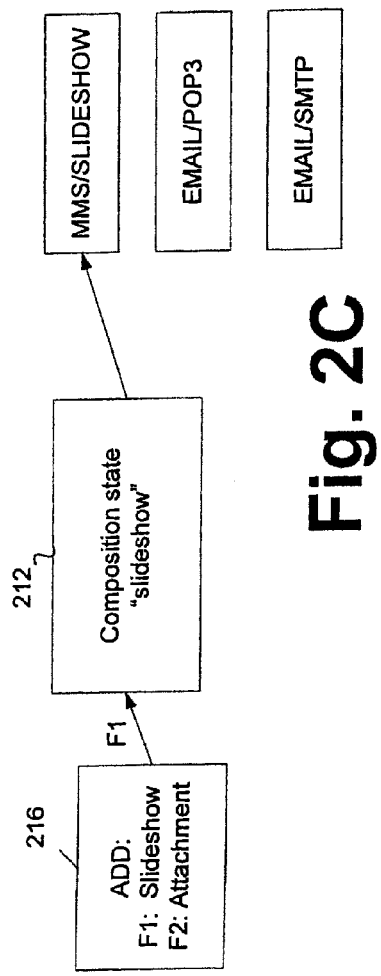
Figure 2D:
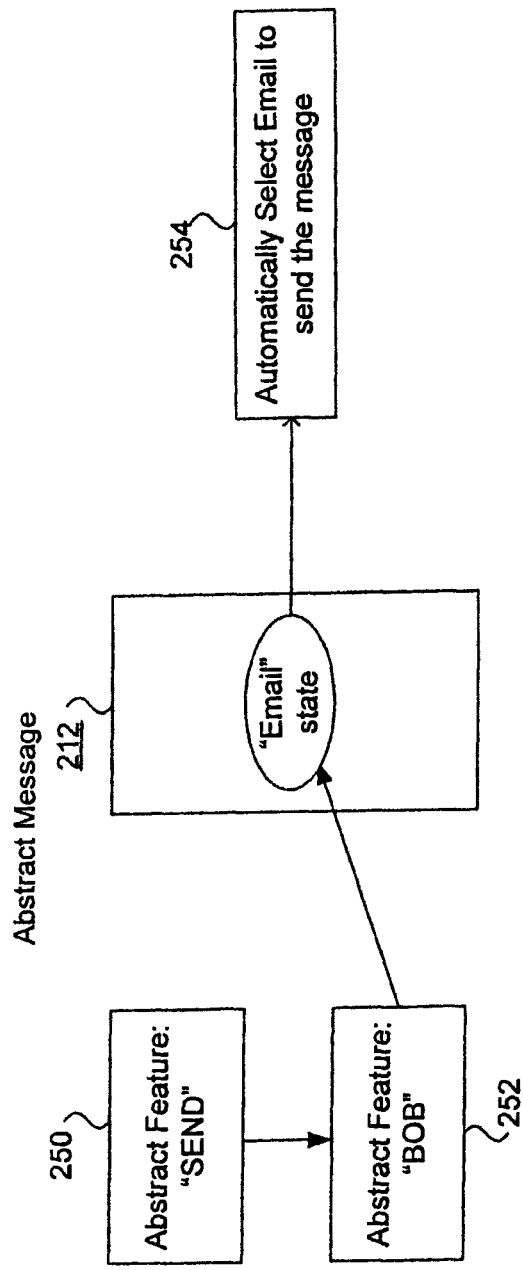

As shown in FIG. 2C, when a feature F1 ("add slideshow") is selected, a composition state "add slideshow" can be added to the abstract message 212. This can, for example, result in selection of the "mms/slideshow" message type. It should also be noted that abstract features may also be presented to the user. Referring to FIG. 2D, an abstract "send" feature 250 can be presented to the user. The user then may select another abstract feature (or option), for example "Bob" 252 which can be an email alias. In this example, "Bob" is known only as an email address. As a result, the abstract message 212 will include a state "email". Hence, email is automatically selected (254) to send the message.

As another example, adding a slide would add a new slide layout to the contents of the message. The MMS protocol would understand this new layout and allow it, so MMS remains as a viable option along with all the features of MMS. However, the SMS protocol would not understand this new layout and would reject it, so SMS would not remain a viable option. As another example, on a different message, adding a email address is allowed because SMTP & MMS both enable that feature. Once the email address is added the MMS & SMTP protocol would understand the address type and allow it, so MMS remains as a viable option along with all the features of MMS. The SMS protocol would not understand the address type and would reject it, so SMS would not remain a viable option.

Figure 3:
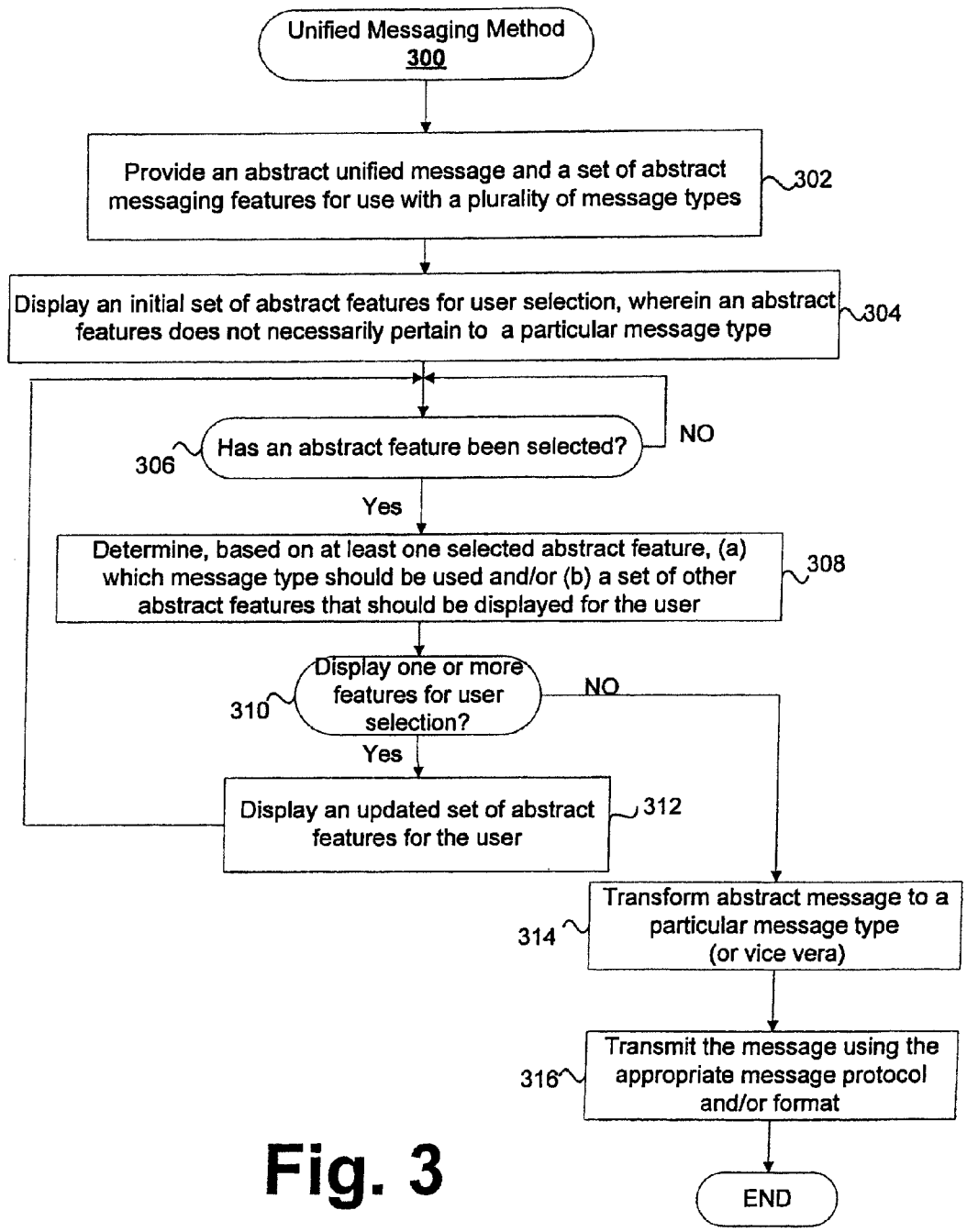
FIG. 3 depicts a unified messaging method in accordance with one embodiment of the invention.

FIG. 3 depicts a unified messaging method 300 in accordance with one embodiment of the invention. Initially, an abstract unified message and a set of abstract messaging features are provided (302). It should be noted that the abstract unified message can represent a plurality of different message types. Next, an initial set of abstract features are displayed (304). These abstract features can be selected by the user. As will be appreciated, the abstract features do not need to pertain to a particular message type. Rather, the abstract feature can represent, for example, an abstract operation (e.g., send message) that can be performed using various message types. As another example, an abstract feature may represent another option (e.g., "Bob") representing another user.

In any case, when it is determined (306) that an abstract feature has been selected 306, it is determined, based on at least one selected abstract feature, which message type should be used (308(*a*)) and/or it is determined whether a set of other abstract features should be displayed (308(*b*)) for the user. Based on at least one selected feature, it is determined whether one or more features should be displayed. Accordingly, an updated set of features can be displayed (312) for the user. Thereafter, it can be determined whether another abstract feature has been selected 306. When it is determined 310 that no more features should be displayed (i.e., the message should be sent), the abstract message is transformed (314) to a particular message type so that it can be transmitted (316) using an appropriate message protocol and message format. The unified messaging method 300 ends following the transmission 316 of the message.

Figure 4:
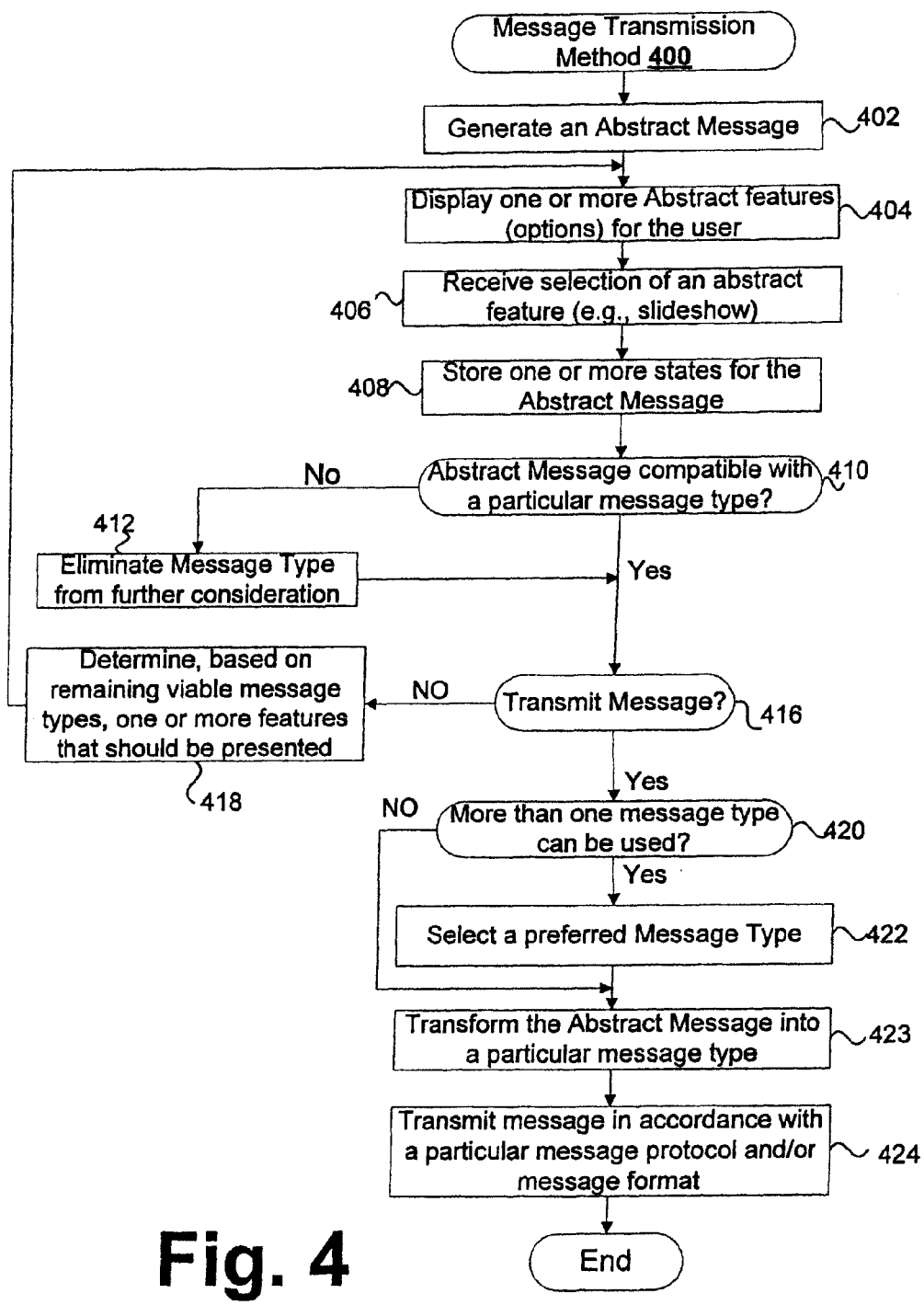
FIG. 4 depicts a message transmission method for generating and transmitting a message in accordance with one embodiment of the invention.

To further illustrate, FIG. 4 depicts a message transmission method 400 for generating and transmitting a message in accordance with one embodiment of the invention. As will be appreciated by those skilled in the art, other messaging operations (e.g., receiving and displaying a message) can be implemented in accordance with principles illustrated herein.

Initially, an abstract message is generated (402). Next, one or more abstract features (or options) are displayed 404 for the user selection. When an abstract feature is selected (406), one or more states are stored (408) for the abstract message. Typically, the one or more states have been pre-defined for the selected feature. However, these states may also be dynamically defined at runtime.

In any case, after the one or more states have been stored (408) in the abstract message, it is determined (410) whether the abstract message is compatible with a particular message type. Next, it is determined (412) whether the message type should be eliminated from further consideration. Accordingly, if it is determined (410) the abstract message type is not compatible with the message type that particular message type is eliminated (412) from further consideration. Thereafter, it is determined (416) whether the message should be transmitted. If it is determined (416) that the message should be transmitted, one or more features that can be selected are determined (418) and displayed 404 for the user. It should be noted that these features are determined (418) based on the remaining viable message types. In other words, message types that have been eliminated (412) are not considered when it is determined (418) what options should be displayed. When it is determined (416) that the message should be transmitted, it is determined (419) whether one or more message types can be used to transmit the message. If one or more message types may be used to transmit the message, a preferred message type is selected (420). The preferred message type can, for example, be selected based on user preferences, or one or more rules which may have been predefined. In any case, the abstract message is transformed (423) into a particular message type (protocol and/or format). The message is transmitted (424) in accordance with a particular message protocol and/or message format. The message transmission method 400 ends following the transmission 424 of the message.

Appendix A provides additional examples that further illustrate best messaging.

The advantages of the invention are numerous. Different embodiments or implementations may have one or more of the following advantages. One advantage of the invention is that users can exchange messages on handheld devices without having to understand numerous message types and protocols. Another advantage of the invention is that less input is required from the user as undesirable options are eliminated. Yet another advantage is that the invention can be implemented to enforce rules or preferences for exchanging messages. Still another advantage of the invention is users may be provided with abstract features and a message type and a protocol can be automatically selected for the user.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

Appendix A

Assuming two message protocols of SMS & MMS, four (4) exemplary message types: [T1] SMS-Text, [T2] SMS-Rich (EMS), [T3] MMS-Slideshow (SMIL), and [T4] MMS-Multipart (Inline) may be constructed and listed in order of priority. Where Message type T1 represents a particular format (i.e., text) using a particular protocol (e.g., the SMS protocol), and so forth.

Further assuming a set of features for these exemplary message types: [F1] Add-text, [F2] Add-Slide, [F3] Add-EMS-Image, [F4] Add-JPG-Image [F5] Send-to-Email, [F6] Send-to-Phone#, the features that each of the Message types can support can, for example, be as follows:

F1 (T1, T2, T3, T4),
F2 (T3),
F3 (T2),
F4 (T3, T4),
F5 (T3, T4),
F6 (T1, T2, T3)

It should be noted that a Feature (e.g., Add-text [F1]) can be used with one or more message types (e.g., T1, T2, T3, and T4).

It should also be noted that the feature set can be much larger and not simply limited to types of content added, but could also include formatting text or position messaging elements. In any case, each of these message types has a set of features that the user is able to choose from while composing.

Following are some examples that demonstrate best messaging. However, actual determination rules may vary between implementations.

| | Case A - User starts free form composing | |
|---|---|---|
| User actions | Available Features to the user (and feature owner) | Message would be sent as |
| Start Composing | F1 (T1, T2, T3, T4), F2 (T3), F3 (T2), F4 (T3, T4), F5 (T3) F6 (T1, T2, T3) | T1 (the highest priority) |
| User adds a JPG Image (F4) | F1 (T1, T2, T3, T4), F2 (T3), F4 (T3, T4) F5 (T3) F6 (T1, T2, T3) | T3 (the highest priority) |
| User chooses Address Send | Can only add email addresses (F5) | T3 |
| Sent | | T3 |

In case A, when a user selects "adds a JPG image" (F4) in compose mode, corresponding message types T3 and T4 are recognized. As a result, feature F3 will be eliminated as an option because feature F3 is not supported for either message types T3 or T4. Next, the user chooses an "Address send" option. As a result, an email address feature (F5) is automatically selected for the user because "add a JPG option" (F4) has already been selected. Finally, the JPG image is emailed as a type T3.

| | Case B - User chooses a phone number to send a message to from their phone book | |
|---|---|---|
| User actions | Available Features to the user (and feature owner) | Message would be sent as |
| Choose to send to a phone number (F6) | F1 (T1, T2, T3), F2 (T3), F3 (T2), F4 (T3, T4), F5 (T3), F6 (T1, T2, T3) | T1 (the highest priority) |
| User adds a slide (F2) | F1 (T3), F2 (T3), F4 (T3), F5 (T3), F6 (T3) | T3 |
| Send | | T3 |

In case B, when the user chooses "send to a phone number" (F6) all message types will be available. However, when "add a slide" (F2) is selected, all message types expect message type T3 are eliminated as an option.

What is claimed is:

1. A handheld communication device for transmission of messages to recipient devices, the handheld communication device comprising:
   a display; and
   a processor configured, in at least one mode of message composition, to:
      present a unified messaging interface to a user via the display for composition of messages which can be transmitted from the handheld communication device in at least two different transmittal message types, including a Short Message Service (SMS) transmittal message type and a first non-SMS transmittal message type;
      determine, based at least in part on a recipient address associated with a message, whether the first non-SMS transmittal message type can be used to transmit the message to the recipient address;
      automatically select the first non-SMS transmittal message type to be used for the transmission of the message to the recipient address when it is determined that the first non-SMS transmittal message type can be used; and
      automatically select the SMS transmittal message type to be used for the transmission of the message to the recipient address when it is determined that the first non-SMS transmittal message type cannot be used.

2. The handheld communication device of claim 1, wherein the processor is configured, in the at least one mode of message composition, to transmit the message to the recipient address using the selected transmittal message type.

3. The handheld communication device of claim 1, wherein the processor is configured, in the at least one mode of message composition, to use a server to determine whether the first non-SMS transmittal message type can be used to transmit the message.

4. The handheld communication device of claim 1, wherein the first non-SMS transmittal message type is transmitted by a communication network path including a wireless local area network.

5. The handheld communication device of claim 1, wherein the processor is configured, in the at least one mode of message composition, to determine whether the first non-SMS transmittal message type can be used based at least in part upon a user preference.

6. The handheld communication device of claim 1, wherein the at least two different transmittal message types further include a second non-SMS transmittal message type and wherein the processor is configured, in the at least one mode of message composition, to:
   determine, based at least in part on the recipient address, whether the SMS transmittal message type can be used to transmit the message to the recipient address; and
   automatically select the second non-SMS transmittal message type to be used for the transmission of the message to the recipient address when it is determined that the first non-SMS transmittal message type cannot be used and that the SMS transmittal message type cannot be used;
   wherein the automatically selecting the SMS transmittal message type to be used for the transmission of the message occurs when it is determined that the first non-SMS transmittal message type cannot be used and that the SMS transmittal message type can be used.

7. The handheld communication device of claim 1, wherein the second non-SMS transmittal message type is a Multimedia Messaging Service (MMS) transmittal message type.

8. A method of operating a handheld communication device for transmission of messages to recipient devices, the handheld communication device comprising a display, the method comprising:
   presenting a unified messaging interface to a user via the display for composition of messages which can be transmitted from the handheld communication device in at least two different transmittal message types, including a Short Message Service (SMS) transmittal message type and a first non-SMS transmittal message type;
   determining, based at least in part on a recipient address associated with a message, whether the first non-SMS transmittal message type can be used to transmit the message to the recipient address;
   automatically selecting the first non-SMS transmittal message type to be used for the transmission of the message to the recipient address when it is determined that the first non-SMS transmittal message type can be used; and
   automatically selecting the SMS transmittal message type to be used for the transmission of the message to the recipient address when it is determined that the first non-SMS transmittal message type cannot be used.

9. The method of claim 8, further comprising:
   transmitting the message to the recipient address using the selected transmittal message type.

10. The method of claim 8, wherein the determining comprises using a server.

11. The method of claim 8, wherein the first non-SMS transmittal message type is transmitted by a communication network path including a wireless local area network.

12. The method of claim 8, wherein the determining is further based at least in part upon a user preference.

13. The method of claim 8, wherein the at least two different transmittal message types further include a second non-SMS transmittal message type and wherein the method further comprises:
   determining, based at least in part on the recipient address, whether the SMS transmittal message type can be used to transmit the message to the recipient address; and
   automatically selecting the second non-SMS transmittal message type to be used for the transmission of the message to the recipient address when it is determined that the first non-SMS transmittal message type cannot be used and that the SMS transmittal message type cannot be used;
   wherein the automatically selecting the SMS transmittal message type to be used for the transmission of the message occurs when it is determined that the first non-SMS transmittal message type cannot be used and that the SMS transmittal message type can be used.

14. The method of claim 13, wherein the second non-SMS transmittal message type is a Multimedia Messaging Service (MMS) transmittal message type.

15. A non-transitory computer-readable medium storing computer-readable instructions thereon, the computer-readable instructions executable by a processor of a handheld communication device to perform a method for transmission of messages from the handheld communication device to recipient devices, the handheld communication device including a display, the method comprising:
   presenting a unified messaging interface to a user via the display for composition of messages which can be transmitted from the handheld communication device in at least two different transmittal message types, including a Short Message Service (SMS) transmittal message type and a first non-SMS transmittal message type;

determining, based at least in part on a recipient address associated with a message, whether the first non-SMS transmittal message type can be used to transmit the message to the recipient address;

automatically selecting the first non-SMS transmittal message type to be used for the transmission of the message to the recipient address when it is determined that the first non-SMS transmittal message type can be used; and automatically selecting the SMS transmittal message type to be used for the transmission of the message to the recipient address when it is determined that the first non-SMS transmittal message type cannot be used.

16. The non-transitory computer-readable medium of claim 15, wherein the method further comprises:

transmitting the message to the recipient address using the selected transmittal message type.

17. The non-transitory computer-readable medium of claim 15, wherein the determining comprises using a server.

18. The non-transitory computer-readable medium of claim 15, wherein the first non-SMS transmittal message type is transmitted by a communication network path including a wireless local area network.

19. The non-transitory computer-readable medium of claim 15, wherein the determining is further based at least in part upon a user preference.

20. The non-transitory computer-readable medium of claim 15, wherein the at least two different transmittal message types further include a second non-SMS transmittal message type, and wherein the method further comprises:

determining, based at least in part on the recipient address, whether the SMS transmittal message type can be used to transmit the message to the recipient address; and automatically selecting the second non-SMS transmittal message type to be used for the transmission of the message to the recipient address when it is determined that the first non-SMS transmittal message type cannot be used and that the SMS transmittal message type cannot be used;

wherein the automatically selecting the SMS transmittal message type to be used for the transmission of the message occurs when it is determined that the first non-SMS transmittal message type cannot be used and that the SMS transmittal message type can be used.

21. The non-transitory computer-readable medium of claim 20, wherein the second non-SMS transmittal message type is a Multimedia Messaging Service (MMS) transmittal message type.

* * * * *